United States Patent [19]

Peeples

[11] 4,082,930

[45] Apr. 4, 1978

[54] LIQUID LEVEL SENSOR

[75] Inventor: Denny L. Peeples, Dayton, Ohio

[73] Assignee: General Motors Corporation, Detroit, Mich.

[21] Appl. No.: 660,170

[22] Filed: Feb. 23, 1976

[51] Int. Cl.² ............................................. H01H 35/18
[52] U.S. Cl. ................................ 200/84 C; 340/52 C
[58] Field of Search ................ 200/84 R, 84 B, 84 C, 200/61.2, 82 D, 81.9 M; 335/205, 207, 151, 153; 73/308, 313, 319, 334; 116/110, 118 R; 340/52 C, 59, 60, 244 A, 244 E

[56] References Cited

U.S. PATENT DOCUMENTS

| 3,697,942 | 10/1972 | Hocking | 340/52 C |
| 3,896,281 | 7/1975 | Feoktistov | 200/84 C |

Primary Examiner—Gerald P. Tolin
Attorney, Agent, or Firm—Warren D. Hill

[57] ABSTRACT

A liquid reservoir such as that for a brake master cylinder has a float in the liquid, a magnet and a reed switch secured to the float at a fixed spacing so that normally at high liquid level the reed switch is in a given state. When the liquid level falls, the float approaches a body of magnetic material suspended at a desired level in the reservoir or the bottom of the reservoir which comprises magnetic material. When low liquid level is reached, the body of magnetic material alters the flux field from the magnet to either increase or decrease the influence the magnet on the reed switch to cause a change of state of the reed switch thereby indicating low liquid level.

3 Claims, 3 Drawing Figures

LIQUID LEVEL SENSOR

This invention relates to a liquid level detector of the type employing a reed switch and a magnet.

It is often desired to detect a critical liquid level in a reservoir, for example, to get an indication of a low reserve of brake fluid in a master cylinder reservoir. It has been proposed to utilize a reed switch and a magnet for operating the reed switch. The switch and magnet are movable relative to one another dependant on the liquid level so that the reed switch is operated at a predetermined level. That arrangement sometimes causes design problems and added manufacturing expense since it is necessary to provide separate supports for the magnet and the reed switch. These difficulties are compounded where it is desired to use a single sensor arrangement in a variety of configurations or dimensions.

It is therefore a general object of this invention to provide a liquid level sensor incorporating a magnet and a reed switch in an integral unit which is applicable to reservoirs of various configurations and dimensions.

It is a further object of the invention to provide a liquid level sensor having a magnet and a reed switch mounted in fixed relationship to one another.

The invention is carried out by providing a member in a liquid reservoir having a magnet and a reed switch secured thereto in fixed relationship, a second member in the reservoir of magnetic material with the two members being arranged to move relatively to one another as the liquid level changes wherein the change in spacing between the magnetic material and the magnet influences the magnetic field to alter its influence of the reed switch so that the state of the reed switch will change when the two members reach a certain spacing indicative of a given liquid level.

The above and other advantages will be made more apparent from the following specification taken in conjunction with the accompanying drawings wherein like reference numerals refer to like parts and wherein.

Figure 1:
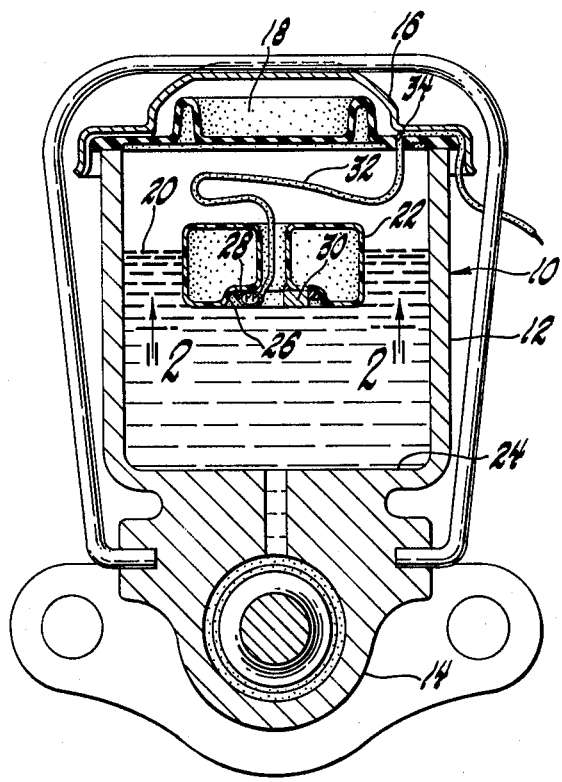
FIG. 1 is a cross-sectional view of a brake fluid reservoir incorporating a liquid level detector according to the invention.
Figure 2:
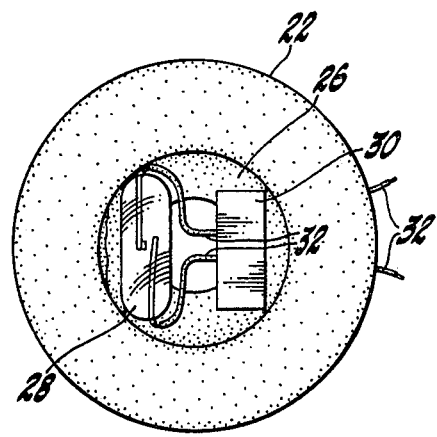
FIG. 2 is a view of a portion of the liquid level detector taken along lines 2—2 of FIG. 1.

Referring to FIG. 1, a casting 10 of magnetic material forms a housing for a brake fluid reservoir 12 and a brake master cylinder 14. The top of the reservoir is enclosed by a sheet metal cover 16 and a diaphragm seal 18 clamped between the walls of the reservoir 12 and the cover 16. Liquid 20 within the reservoir supports a float 22 which approaches the bottom 24 of the reservoir as the liquid level decreases. The float 22 is generally doughnut shaped and is formed of non-magnetic material in a conventional manner. The bottom of the float 22 contains a recess 26 in which, as best shown in FIG. 2, a reed switch 28 and a magnet 30 are secured by epoxy at a fixed spacing. Preferably the reed switch is normally closed but is held open by the field of the magnet 30 when the liquid 20 is at a high level. The opposite ends of the reed switch 20 are connected to flexible electrical leads 32 which extend through an aperture 34 in the seal 18 and under the cover 16 to an external warning circuit, not shown. Sufficient free length of conductors 32 is maintained within the reservoir to allow the float 22 to follow the liquid downward toward the bottom of the reservoir. When the float 22 does approach the bottom 24 of the reservoir which latter comprises a body of magnetic material, the magnetic flow path is at least to some degree shunted through the reservoir bottom 24 to decrease the field strength influencing the reed switch 28 allowing the reed switch to change state thereby assuming its normally close position. This changed state of the reed switch is indicative of the low level of the liquid 20.

It will now be apparent to those skilled in the art that many variations are possible within the scope of the invention. For example, the magnet and reed switch may be arranged so that normally the magnetic field influencing the reed switch is weak and the body of magnetic material is so arranged that when it becomes close to the switch-magnet assembly, the field acting on the reed switch is increased to cause a change of switch state. Alternatively, the switch and magnet assembly may be held stationary and the body of magnetic material which alters the magnetic field is mounted on the movable member. This avoids the necessity of flexible leads 32. A further form of the invention would have the stationary member mounted above the movable member so that a separation of the members and a switching action occurs when the liquid level falls; of course, the switch-magnet assembly may be mounted on either the stationary or the movable member. In addition, it will readily be seen that the arrangement of the type described is equally useful to sense high liquid level in a container as well as low liquid level in as much as a change of state will occur whether the magnetic body and the switch-magnet assembly are moving together or moving apart.

Figure 3:
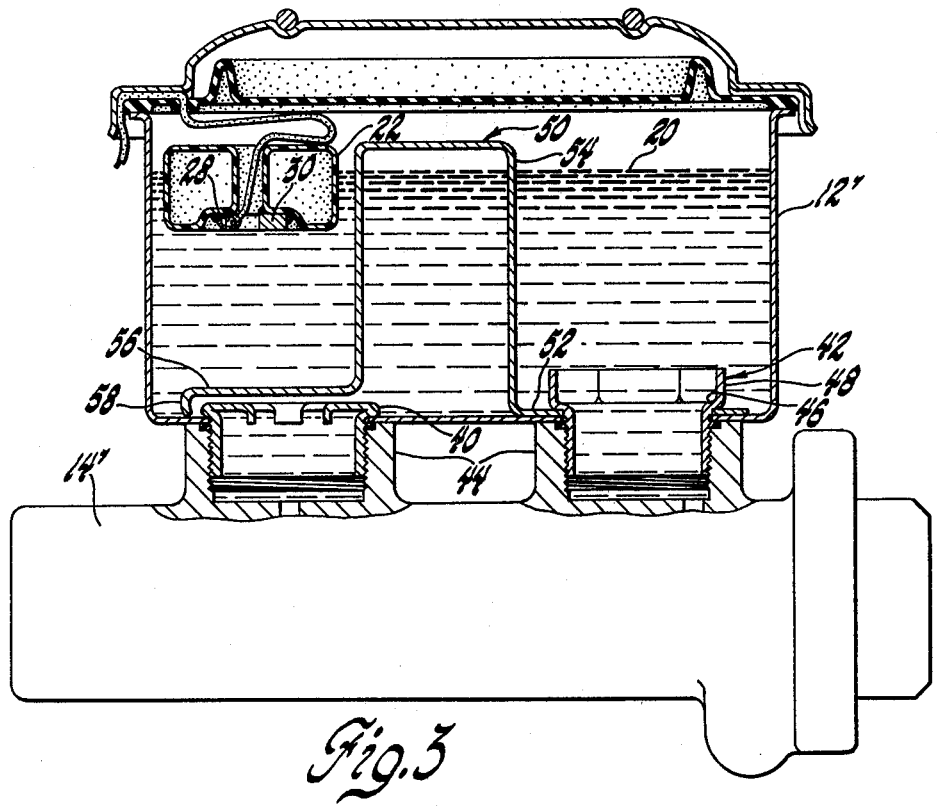
FIG. 3 is a cross-sectional view of a brake fluid reservoir incorporating a liquid level detector according to a second embodiment of the invention.

A second embodiment of the invention is shown in FIG. 3 wherein a sheet metal brake fluid reservoir 12' is secured to a master cylinder body 14'. Two hollow nuts 40 and 42 pass through apertures in the bottom of the reservoir 12' and are threaded into hollow bosses 44 in the brake cylinder 14' to mount the reservoir 12' to the brake cylinder 14' and also to provide liquid communication therebetween. The nut 42 has radially outwardly extending portions 46 and an upwardly extending terminal portion 48 to provide a standpipe or secondary reservoir which in effect divides the reservoir 12' into two compartments when the level of the liquid 20 falls below the top of the portion 48. A baffle 50 formed of sheet metal such as steel or other magnetic material includes a first horizontal portion 52 apertured to receive the nut 42 and which is secured to the bottom of the reservoir 12' by the horizontal portion 46 of the nut 42. The baffle 50 has an inverted U-shaped portion 54 substantially in the center of the reservoir 12'. The baffle 50 further includes a second horizontal portion 56 generally in the area above the nut 40 which terminates in a downwardly extending flange 58 which rests on the bottom of the reservoir 12'. The baffle 50 is slightly spaced from the sides of the reservoir so that fluid communication is possible from one side of the baffle to the other. The baffle has the effect of retarding splashing or sloshing of liquid within the reservoir. A float 22 like that described for the embodiment of FIGS. 1 and 2 and carrying reed switch 28 and a magnet 30 is located in the liquid 20 above the horizontal portion 56 of the baffle 50. Thus the horizontal portion 56 of the baffle serves as the body of magnetic material which alters the magnetic field to change the state of the reed switch as the liquid level decreases sufficiently for the switch-magnet assembly to approach the portion 56. The horizontal portion may be formed at any desired height above the reservoir bottom to establish the switch point of the liquid level sensor at the desired level. With this arrangement, it is convenient to use the same float assembly in reservoirs of various sizes or for applications requiring various liquid sensing levels by changing only the shape of the baffle 50. Of course, it is not essential that the horizontal portion 56 be part of a baffle, per se, in order to provide a body of magnetic material for switch actuation at some level above the bottom of the reservoir.

It is thus seen that the liquid level detector having a reed switch and a magnet spaced at a fixed distance provides an improved and simplified means of detecting liquid level.

The embodiments of the invention in which an exclusive property or privilege is claimed are defined as follows:

1. A liquid level sensor for a liquid reservoir comprising
    a first member having fixedly secured thereto a magnetically actuable reed switch,
    a magnet secured to the first member at a fixed distance from the reed switch,
    a second member comprising a body of magnetic material normally spaced from the first member so that the magnetic field of the magnet and its influence on the reed switch is altered according to the proximity of the first and second member,
    means for mounting one of the said members at a position corresponding to a certain liquid level in the reservoir, and
    means for moving the other of the members according to liquid level, so that the spacing between the members varies as the liquid level changes,
    whereby the reed switch is in one state when the spacing between the members exceeds a certain amount and the reed switch is in another state when the spacing between the members is less than the certain amount so that the state of the reed switch depends on the liquid level.

2. A liquid level sensor for a liquid reservoir comprising
    a float member supported by the liquid in the reservoir having fixedly secured thereto both a magnetically actuable reed switch and a magnet spaced at a fixed distance from one another so that the reed switch is biased to a first state indicative of high liquid level when the float is substantially spaced from the bottom of the reservoir,
    a body of magnetic material comprising the bottom of the reservoir whereby when the liquid reaches a low level and the float member approaches close enough to the bottom of the reservoir for the body of the magnetic material to alter the magnetic field of the magnet and its influence on the reed switch, the reed switch changes to a second state indicative of low liquid level.

3. A liquid level sensor for a liquid reservoir comprising
    a float member supported by the liquid in the reservoir,
    a magnet and a magnetically actuable reed switch both fixedly mounted on the float at a fixed spacing between the magnet and the switch,
    a body of magnetic material in the reservoir below the float so that at high liquid level the float is sufficiently spaced from the body of magnetic material so that the reed switch is biased to one state and at low liquid level the float approaches the body of magnetic material so that the field of the magnet and its influence on the reed switch is so altered that the reed switch changes to another state, and
    means for supporting the body of magnetic material in the reservoir at a position to effect the change of state of the reed switch at a desired liquid level.

* * * * *